(12) United States Patent
Schaffnit

(10) Patent No.: US 8,148,952 B2
(45) Date of Patent: Apr. 3, 2012

(54) CONTROL STRATEGY FOR HV BATTERY EQUALIZATION CHARGE DURING DRIVING OPERATION IN FUEL CELL HYBRID VEHICLES

(75) Inventor: Jochen Schaffnit, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

(21) Appl. No.: 12/502,969

(22) Filed: Jul. 14, 2009

(65) Prior Publication Data

US 2011/0012558 A1    Jan. 20, 2011

(51) Int. Cl.
*H02J 7/04* (2006.01)
*H02J 7/16* (2006.01)

(52) U.S. Cl. .................. 320/162; 320/101; 320/116

(58) Field of Classification Search .................. 320/116, 320/162

See application file for complete search history.

(56) References Cited

U.S. PATENT DOCUMENTS

| | | | | |
|---|---|---|---|---|
| 5,917,308 A * | 6/1999 | Brooke | ............. | 320/118 |
| 6,060,864 A * | 5/2000 | Ito et al. | ............. | 320/136 |
| 6,801,014 B1 * | 10/2004 | Chitsazan et al. | ............. | 320/119 |
| 7,053,588 B2 * | 5/2006 | Nakanishi et al. | ............. | 320/104 |

* cited by examiner

*Primary Examiner* — Ramy Ramadan
(74) *Attorney, Agent, or Firm* — John A. Miller; Miller IP Group, PLC

(57) ABSTRACT

A system and method for equalizing the state of charge of the cells of a battery in an electric vehicle while the vehicle is being driven. The method includes monitoring the state of charge of the battery cells in the battery and measuring the actual current of the battery. The method also includes determining a maximum charge current limit of the battery and comparing the actual battery current and the charge current limit. The method also includes modifying the charge current limit based on the comparison between the actual battery current and the charge current limit. The method then converts the modified charge current limit to a power charge limit and then over charges the battery using a small amount of current and the power charge limit so that all of the cells in the battery become fully charged.

20 Claims, 3 Drawing Sheets

CONTROL STRATEGY FOR HV BATTERY EQUALIZATION CHARGE DURING DRIVING OPERATION IN FUEL CELL HYBRID VEHICLES

BACKGROUND OF THE INVENTION

1. Field of the Invention

This invention relates generally to a system and method for providing battery cell charge equalization and, more particularly, to a system and method for charging a fuel cell system battery on a vehicle during vehicle operation to provide battery cell state of charge equalization.

2. Discussion of the Related Art

Most fuel cell vehicles are hybrid vehicles that employ a rechargeable supplemental high voltage power source in addition to the fuel cell stack, such as a DC battery or an ultracapacitor. The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor can provide regenerative braking that can also be used to recharge the battery through the DC bus line.

As is well understood in the art, a high voltage battery for this purpose typically includes several battery cells electrically coupled in series. As a result of many factors, such as internal resistance, electrical connections, battery aging, etc., the state of charge (SOC) of each cell in the battery may drift apart during operation of the battery over time. A battery management system may be coupled to the high voltage battery to monitor the state of charge of each battery cell and the temperature of the battery, and control how much the battery can be charged and discharged based on the state of charge of the maximum charged cell and the minimum charged cell. Particularly, the battery cannot be used to provide power if the cell with the lowest state of charge will drop below some minimum state of charge because that cell may become damaged, and the battery cannot be over charged beyond some maximum state of charge for the cell with the highest state of charge because that cell may become overheated and damaged. Thus, a cell with a low state of charge may prevent the battery from being used even though the other cells may have a suitable or significant state of charge.

Currently, the only remedy to equalize the state of charge of the cells of a battery is to take the vehicle to a service center and charge the battery with a special charging device that provides cell overcharging while closely monitoring the temperature of the battery so that all of the cells become fully charged and are equalized. Clearly such a solution has obvious drawbacks because the vehicle cannot be driven during such service and includes the obvious inconvenience of having to take the car to the service center.

SUMMARY OF THE INVENTION

In accordance with the teachings of the present invention, a system and method are disclosed for equalizing the state of charge of the cells of a battery in an electric vehicle while the vehicle is being driven. The method includes monitoring the state of charge of the battery cells in the battery and measuring the actual current of the battery. The method also includes determining a maximum charge current limit of the battery and comparing the actual battery current and the charge current limit. The method also includes modifying the charge current limit based on the comparison between the actual battery current and the charge current limit. The method then converts the modified charge current limit to a power charge limit and then over charges the battery using a small amount of current and the power charge limit so that all of the cells in the battery become fully charged.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing battery cell charge equalization is merely exemplary in nature, and is in no way intended to limit the invention or its applications or uses.

Figure 1:
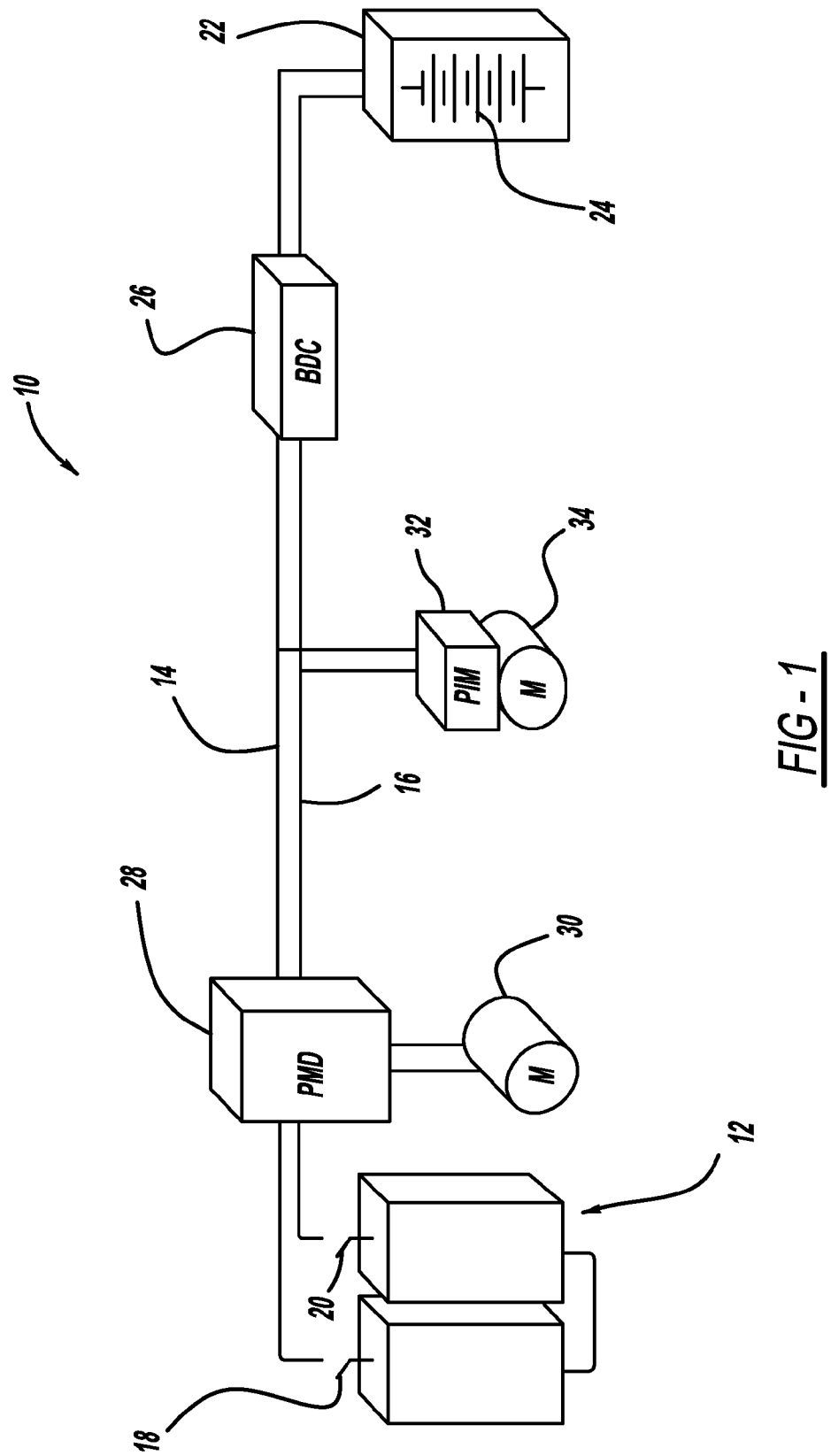
FIG. 1 is a schematic block diagram of an electrical system for a fuel cell vehicle.

FIG. 1 is a schematic block diagram of an electrical system 10 for a fuel cell hybrid vehicle. The system 10 includes a split fuel cell stack 12 electrically coupled to high voltage bus lines 14 and 16 through contactors 18 and 20, respectively. A high voltage battery 22 is also electrically coupled to the high voltage bus lines 14 and 16 where the battery 22 includes battery cells 24 electrically coupled in series. A bidirectional DC/DC converter (BDC) 26 is provided in the bus lines 14 and 16 to charge and discharge the battery 22, which is operating at a different voltage level that the fuel cell stack 12. The electrical system 10 includes a power management and distribution (PMD) device 28 electrically coupled to the bus lines 14 and 16 that connects additional system loads to the bus lines 14 and 16, such as an air compressor 30.

The electrical system 10 also includes a power inverter module (PIM) 32 electrically coupled to the bus lines 14 and 16 and an AC traction motor 34 that is part of an electric traction system (ETS). The PIM 32 converts the DC voltage on the bus lines 14 and 16 to an AC voltage suitable for the traction motor 34. The traction motor 34 provides the traction power to operate the vehicle.

Figure 2:
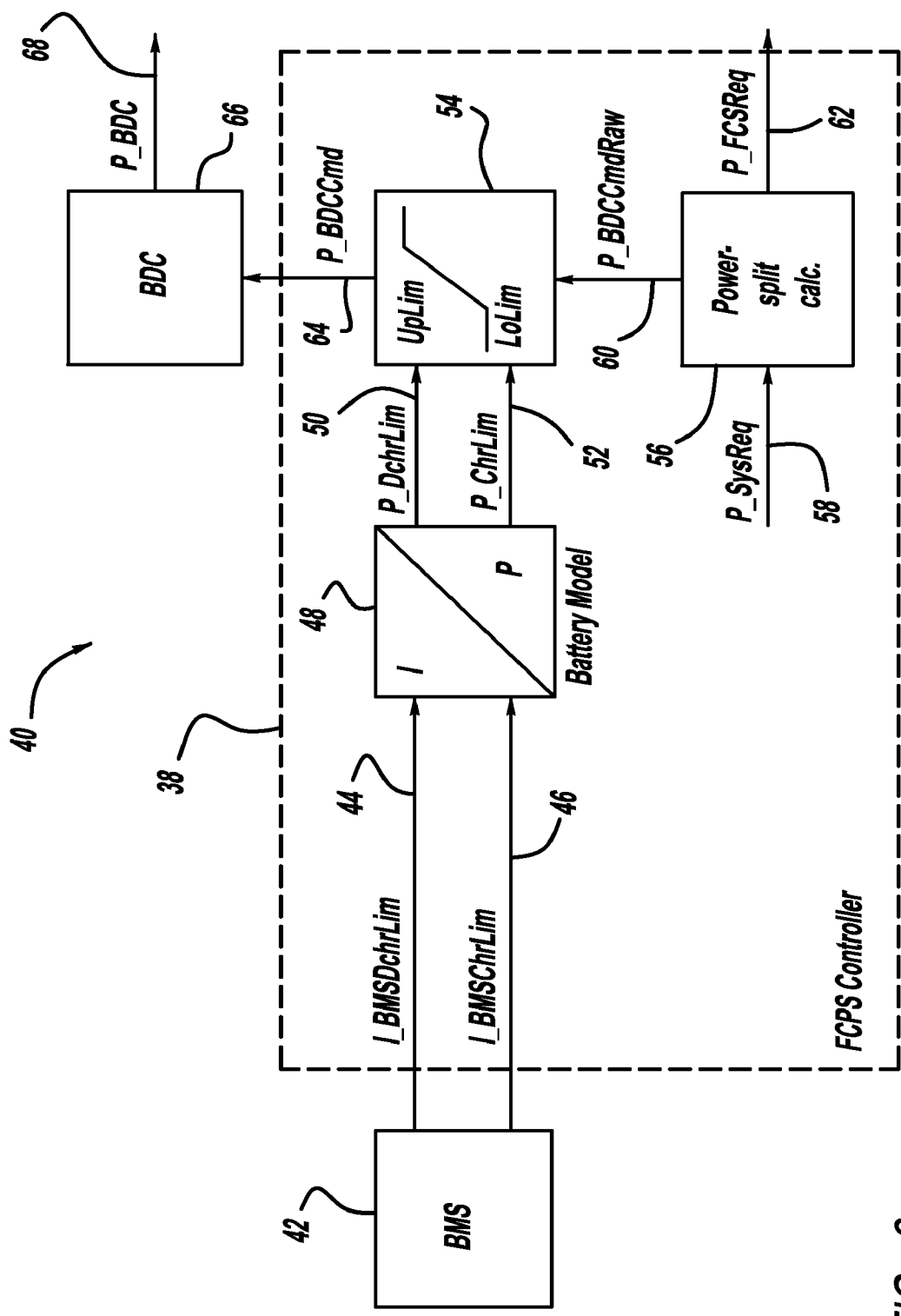
FIG. 2 is a schematic block diagram of a power control system for a fuel cell vehicle.

FIG. 2 is a schematic block diagram of a control system 40 for the electrical system 10. The system 40 includes a battery management system (BMS) 42 that controls the battery 22 and has knowledge of the state of charge of each of the battery cells 24 and the temperature of the battery 22. The BMS 42 provides a discharge current limit signal I_BMSDchrLim on line 44 that identifies the maximum discharge current limit of the battery 22 and a charge current limit signal I_BMSChrLim on line 46 that identifies the maximum charge current limit of the battery 22 necessary to avoid battery damage. The discharge and charge current limit signals are sent to a battery model block 48 in a fuel cell system controller 38 that converts the current limit signals to power limit signals P_DchrLim and P_ChrLim on lines 50 and 52, respectively. This conversion is necessary because the BDC 26 is controlled by a power command signal. The power limit signals are applied to a power limit block 54 that sets the upper and lower power limit values. The upper and lower power limit values are used during normal vehicle driving to limit a raw power command signal P_BDCCmdRaw on line 60 to a BDC 66, representing the BDC 26.

A power-split calculation block 56 determines the power split provided by the fuel cell stack 12 and the battery 22 based on a system request signal P_SysReq to determine how much of the stack power and the battery power will be distributed to the bus lines 14 and 16 to operate the system loads. The power split calculation defines the hybrid strategy that splits the overall system power request P_SysReq and decides how the two power sources will be used to fulfill the vehicle power need in the actually driving situation in the most efficient way. An output signal P_FCSReq is from the block 56 the command that determines how much of the power request will be provided by the fuel cell stack 12. A raw power command signal P_BDCCmdRaw is limited by the power limits P_DchrLim and P_ChrLim at the block 54 to provide the actual battery power command P_BDCCmd. The power command for the battery 22 is then sent to the BDC 66 which provides the battery power output signal P_BDC on line 68 to the battery 22.

According to the invention, an equalization charge is provided to overcharge the battery 22 with a very small charge current, typically on the order of two amps. This very small current needs to be controlled by the BDC 26. The BDC 26 is designed to transmit power up to 35 kW. Therefore, the BDC 26 has a poor accuracy if a very small power/current needs to be adjusted. In addition, battery model accuracies impact the transformation from current to power limits, which may interfere with the equalization charge.

Figure 3:
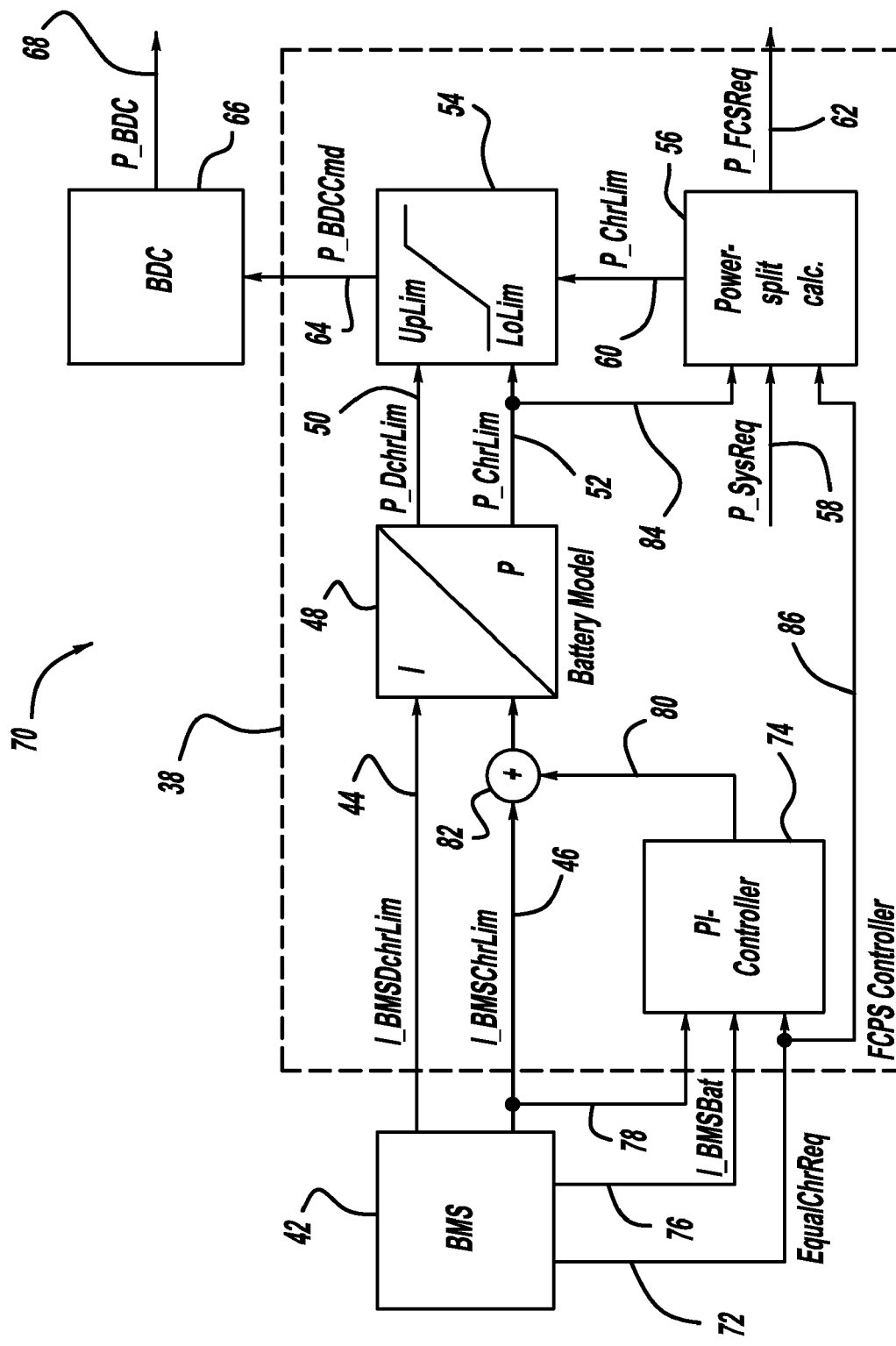
FIG. 3 is a schematic block diagram of a power control system for a fuel cell vehicle that includes control components for providing battery cell charge equalization.

FIG. 3 is a block diagram of a battery control system 70 that provides battery charge cell equalization and overcomes the model inaccuracies identified above, where like elements to the system 40 are identified by the same reference numeral. As discussed above, the BMS 42 includes information about the state of charge of the individual cells 24 and the battery 22. If the state of charge distribution between the individual cells 24 exceeds a predetermined threshold where equalization is desired, then the BMS 42 will set an equal charge request bit EqualChrReq on line 72 indicating that the battery 22 requires charge equalization. The signal on the line 72 is sent to a proportional-integral (PI) controller 74 that initiates the battery charge equalization sequence.

The PI controller 74 also receives a measured battery current on line 76 and the charge limit signal I_BMSChrLim on line 78. The battery current is measured by the BMS 42. Depending on the difference between the measured battery current and the charge current limit, the controller 74 modifies the charge current limit at adder 82 to assure that the actual charge current matches the charge limit to correct the model inaccuracy. The new calculated charge current limit is converted to power by the battery model at the box 48 in the same manner as discussed above where the stack power is now used to charge the battery 22. The new calculated charge current limit is transformed to the charge power limit which is used as the BDC power command P_ChrLim on the line 64.

During the equalization charge sequence, the hybrid strategy in the power-split calculation module 56 will be turned off by the EqualChrReq bit on line 86. The power-split calculation module 58 receives the power charge limit signal P_ChrLim on line 84, and returns the signal to the block 54 on the line 60 instead of the raw command signal P_BDCCmdRaw. The battery 22 will be charged with maximum possible charge power limit P_ChrLim and the overall system power request P_SysReq needs to be fulfilled by the fuel cell system where P_FCSReq=P_SysReq+P_ChrLim.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for equalizing the charge of battery cells in a battery in an electric vehicle, said method comprising:
monitoring the state of charge of the battery cells in the battery;
measuring the actual current of the battery;
determining a maximum charge current limit of the battery;
comparing the actual battery current and the maximum charge current limit;
modifying the maximum charge current limit based on the comparison between the actual battery current and the maximum charge current limit;
converting the modified maximum charge current limit to a power charge limit; and
overcharging the battery using the power charge limit so that all of the cells in the battery become fully charged.

2. The method according to claim 1 wherein overcharging the battery includes overcharging the battery with a current of about 2 amps.

3. The method according to claim 1 wherein a fuel cell stack in the electric vehicle provides the power to charge the battery cells.

4. The method according to claim 1 wherein converting the modified charge current limit to a power charge limit includes using a battery model.

5. The method according to claim 1 wherein comparing the actual battery current and the charge current limit includes comparing the actual battery current and the charge current limit in a proportional-integral controller.

6. The method according to claim 1 wherein measuring the actual current of the battery includes using a battery management system to measure the battery current.

7. The method according to claim 1 wherein modifying the maximum charge current limit includes adding a value to the maximum charge current limit.

8. The method according to claim 1 further comprising turning off a power-spilt calculation module that splits the power distribution between the battery and a fuel cell stack.

9. The method according to claim 1 further comprising initiating the method for equalizing the charge of battery cells in a battery if the state of charge of a minimum cell charge and a maximum cell charge in the battery exceeds a predetermined threshold.

10. A method for equalizing the charge of battery cells in a battery in a fuel cell hybrid vehicle including a fuel cell stack, said method comprising:
monitoring the state of charge of the battery cells in the battery;
measuring the actual current of the battery;
determining a maximum charge current limit of the battery;

comparing the actual battery current and the maximum charge current limit in a proportional-integral controller;

modifying the maximum charge current limit based on the comparison between the actual battery current and the maximum charge current limit by adding a value to the maximum charge current limit;

converting the modified maximum charge current limit to a power charge limit using a battery model; and overcharging the battery using the power charge limit and power from the fuel cell stack so that all of the cells in the battery become fully charged.

11. The method according to claim 10 wherein overcharging the battery includes overcharging the battery with a current of about 2 amps.

12. The method according to claim 10 wherein measuring the actual current of the battery includes using a battery management system to measure the battery current.

13. The method according to claim 10 further comprising turning off a power-spilt calculation module that splits the power distribution between the battery and the fuel cell stack.

14. The method according to claim 10 further comprising initiating the method for equalizing the charge of battery cells in a battery if the state of charge of a minimum cell charge and a maximum cell charge in the battery exceeds a predetermined threshold.

15. A system for equalizing the charge of battery cells in a battery in an electric vehicle, said system comprising:

means for monitoring the state of charge of the battery cells in the battery;

means for measuring the actual current of the battery;

means for determining a maximum charge current limit of the battery;

means for comparing the actual battery current and the maximum charge current limit;

means for modifying the maximum charge current limit based on the comparison between the actual battery current and the maximum charge current limit;

means for converting the maximum modified charge current limit to a power charge limit; and means for overcharging the battery using the power charge limit so that all of the cells in the battery become fully charged.

16. The system according to claim 15 wherein the means for converting the maximum modified charge current limit uses a battery model.

17. The system according to claim 15 wherein the means for comparing the actual battery current and the charge current limit uses a proportional- integral controller.

18. The system according to claim 15 wherein the means for measuring the actual current of the battery is a battery management system.

19. The system according to claim 15 wherein the means for overcharging the battery overcharges the battery with a current of about 2 amps.

20. The system according to claim 15 further comprising a means for turning off a power-split calculation module that splits the power distribution between the battery and a fuel cell stack during the charge equalization.

* * * * *